United States Patent
Lee et al.

(10) Patent No.: US 6,727,607 B2
(45) Date of Patent: Apr. 27, 2004

(54) OSCILLATING RELUCTANCE MOTOR AND RECIPROCATING GAS COMPRESSOR USING THE SAME

(75) Inventors: Dong Il Lee, Seoul (KR); Jun Young Lim, Incheon (KR)

(73) Assignee: LG Electronics Inc., Seoul (KR)

( * ) Notice: Subject to any disclaimer, the term of this patent is extended or adjusted under 35 U.S.C. 154(b) by 67 days.

(21) Appl. No.: 09/987,181

(22) Filed: Nov. 13, 2001

(65) Prior Publication Data

US 2002/0079748 A1 Jun. 27, 2002

(30) Foreign Application Priority Data

Dec. 27, 2000 (KR) .......................... 2000-82915
Dec. 27, 2000 (KR) .......................... 2000-82917

(51) Int. Cl.⁷ .......................... H02K 33/12; F04B 17/03
(52) U.S. Cl. .......................... 310/36; 417/416
(58) Field of Search .......................... 310/37–40, 97

(56) References Cited

U.S. PATENT DOCUMENTS 4,364,000 A * 12/1982 Burke, Jr. .................. 318/128
5,061,107 A * 10/1991 Brooks ........................ 403/24
6,066,829 A * 5/2000 Ishikawa ................ 219/121.68
6,441,517 B1 * 8/2002 Brum et al. ................... 310/37

* cited by examiner

*Primary Examiner*—Burton S. Mullins
*Assistant Examiner*—Judson H. Jones
(74) *Attorney, Agent, or Firm*—Birch, Stewart, Kolasch & Birch, LLP

(57) ABSTRACT

An oscillating reluctance motor includes a rotor having a center on which a rotational shaft is fixed thereto, and a pair of teeth protruding from said rotational shaft and arranged in positions opposite to each other; a stator in which a cylindrical space is formed so that the rotor can rotate and first and second winding parts are formed; rotation control means which is installed between the rotor and a stator to control rotation of the rotor, wherein a first winding coil is wound on the first winding part, a second winding coil is wound on the second winding part and the first winding part and the second winding part are formed having an angle centering around the rotational shaft as a pair so that the rotor can perform periodical rotation movement.

2 Claims, 7 Drawing Sheets

OSCILLATING RELUCTANCE MOTOR AND RECIPROCATING GAS COMPRESSOR USING THE SAME

BACKGROUND OF THE INVENTION

1. Field of the Invention

The present invention relates to a oscillating reluctance motor and a reciprocating gas compressor using the same and particularly, to an oscillating reluctance motor which is suitable for periodically rotating in a certain angle and generating a resonance at a certain frequency.

Also, the present invention relates to a reciprocating gas compressor using an oscillating reluctance motor, which is suitable for controlling a stroke distance due to performing reciprocating movement by periodical rotation movement of the reciprocating reluctance motor.

2. Description of the Related Arts

A conventional reluctance motor generates a rotational torque controlling power supply applied to a coil wound around a stator having multi-phases by using a switch device.

The reluctance motor can generate one-directional rotational torque by magnetic attractive force varying the excitation status between a rotor and a stator in turn.

Also, the reluctance motor can stop the rotor at a certain position when a certain excitation status is not variable and accordingly, various driving controls are possible for generating a reverse rotational force by controlling input pulse signal which is applied to the switch device starting from a maximum inductance.

Therefore, the reluctance motor is used for electronic apparatuses which need directional control or a gas compressor.

An embodiment of a conventional reluctance motor is described with reference to FIG. 1, as follows.

Figure 1:
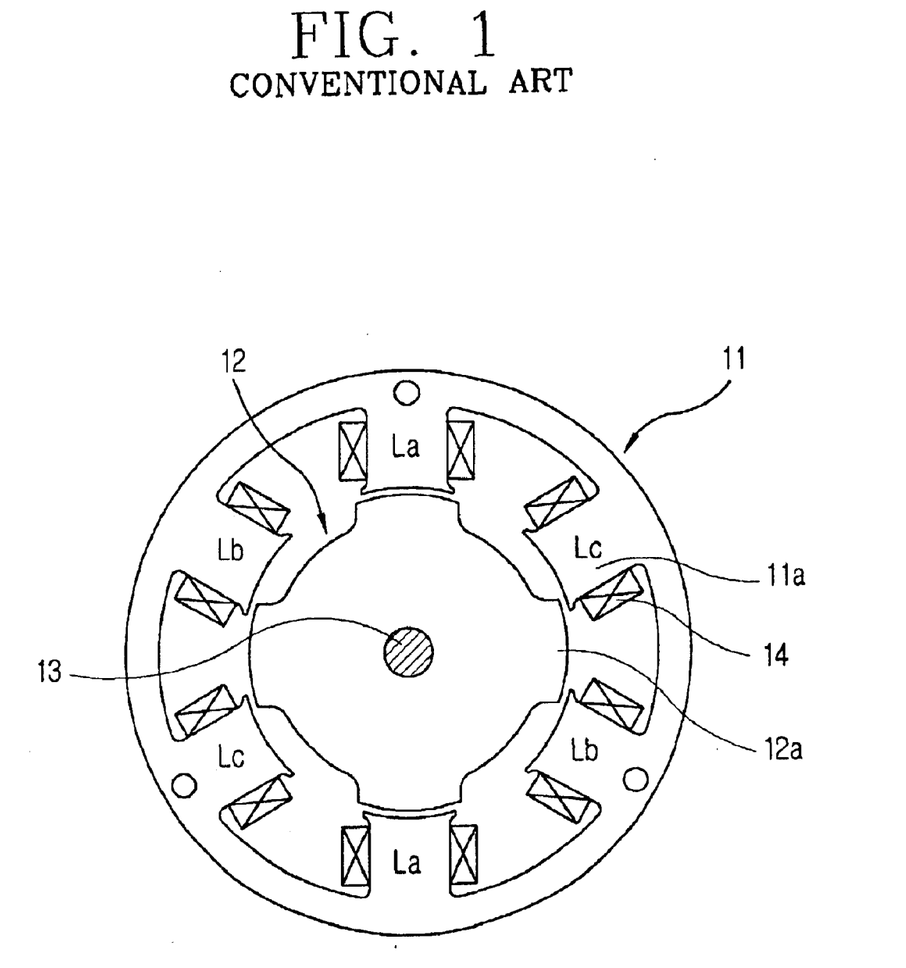
FIG. 1 is a transverse sectional view showing a structure of a conventional reluctance motor.

As shown in FIG. 1, a reluctance motor in accordance with the conventional art has a rotor 12 inserted inside a cylindrical stator 11 which is capable of rotating, a rotational shaft 13 fixed at the center of the rotor 12 as an output shaft, a position detection means (not shown) for detecting position of the rotor 12 and a control part (not shown) for controlling rotation of the reluctance motor according to the detected position by the position detection means.

In the stator 11, six stator teeth 11a having uniform angular interval (60°) are protruded-formed inside a body part and a coil is wound around each stator teeth 11a forming respective stator poles which are connected electrically to stator poles in the direction of diagonal line forming three phases La, Lb and Lc from which identical polarity is generated.

Also, on the peripheral surface of the rotor 12, four rotor teeth 12a are protruded-formed having a uniform angular interval (90°) and accordingly, the rotor 12 rotates forming an air gap with the end portion of the stator teeth 11a.

The conventional reluctance motor having the above-described structure detects the position of the rotor teeth 12a by the position detection means and outputs the detected position pulse (not shown).

Accordingly, if power supply is applied to the excitation coil 14 of the three phases La, Lb and Lc synchronized with the detected position pulse, electromagnetic force is generated.

Also, after generating electromagnetic force by applying electric current to La, and then electronic current to Lb, the rotor teeth 12a of the rotor 12 generates a rotational torque which rotates in counterclockwise direction for minimizing magnetic resistance.

At the same time, the rotor teeth 12a generates driving force with which the rotor 12 rotates by varying the excitation status of each phase in order of La→Lb→Lc.

In addition, the rotation force is generated and used as a power source for machinery, by rotating the rotor 12 in one direction at high speed or in the reverse direction by phase controlling.

The above-described conventional reluctance motor can rotate in one or reverse direction at high speed. However, the motor is not capable of rotating at high speed within a certain angle interval and accordingly, the motor is not suitable for devices and apparatuses which need periodically reciprocating movement in high speed.

Therefore, there was a disadvantage that the motor should have conversion devices for converting a rotational movement to a linear movement.

On the other hand, generally, an example of an apparatus which needs reciprocating movement of high speed, a gas compressor for compressing refrigerant gas comprises a motor device part for generating driving force supplied with power source inside the hermetic housing and a compressor part for sucking and compressing refrigerant gas by using the driving force generated in the motor device part.

An embodiment of the conventional reciprocating gas compressor will be described briefly with reference with FIG. 2.

Figure 2:
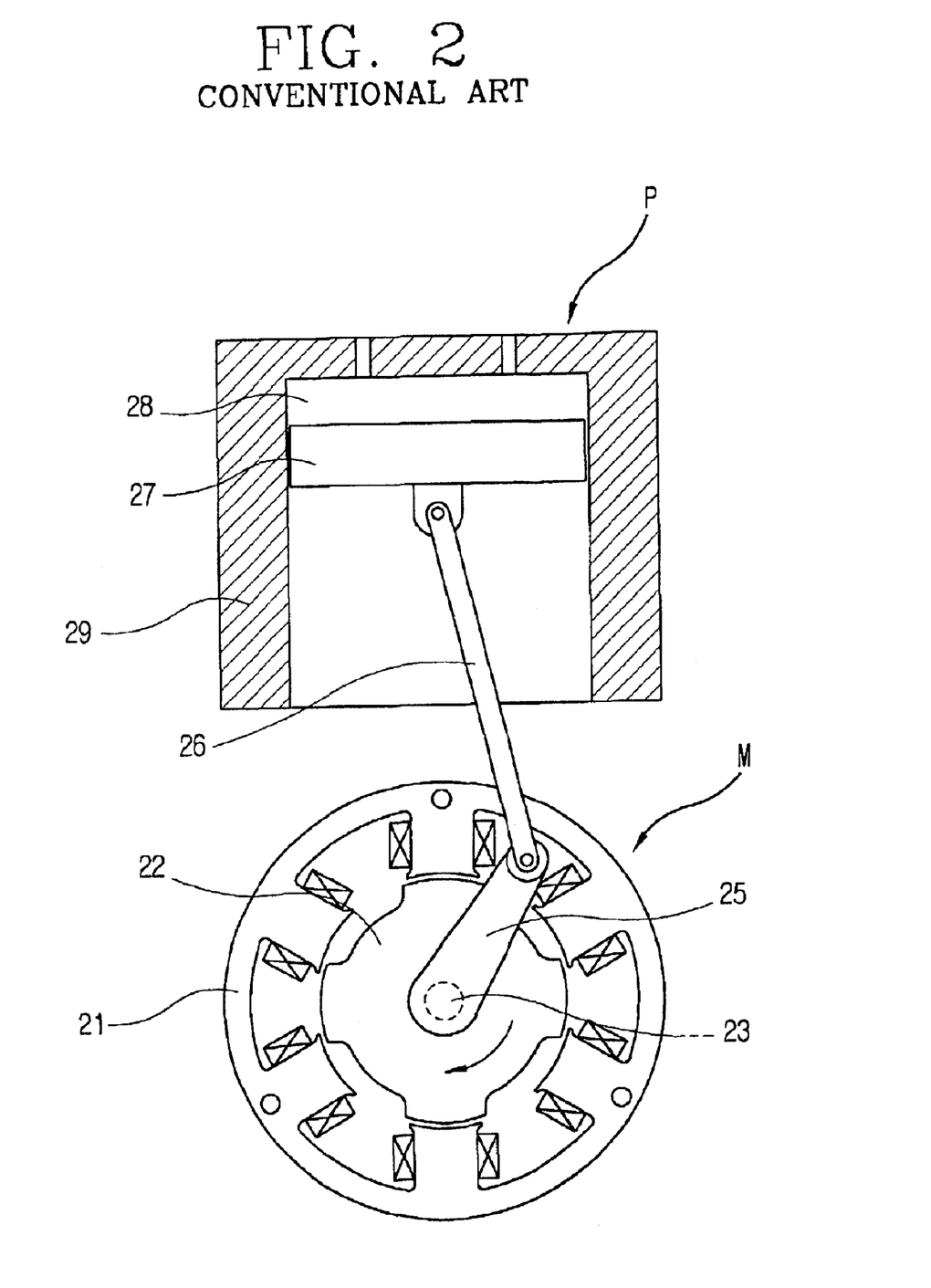
FIG. 2 is a transverse sectional view showing a structure of a conventional gas compressor.

As shown in FIG. 2, the conventional reciprocating gas compressor forms a motor device part M, combining with the rotor 22 so that it can rotate inside the stator 21 and a rotational shaft 23 is fixed to the rotor 22.

Also, one end portion of a connecting rod 26 is combined to an eccentricity part 25 installed in an upper end portion of the rotational shaft 23. A piston 27 is combined to the other end portion of the connecting rod 26, and at the same time the piston 27 reciprocates. Also, a cylinder 29 having a compression space 28 for compressing gas is combined to the piston 27 thus to form a compression device part P.

In a reciprocating gas compressor with the above-described structure, the rotor 22 rotates and the rotational shaft 23 combined to the rotor 22 rotates when power is applied to the motor device part M.

Also, the connecting rod 26 which is combined to the eccentricity part 25 of the rotational shaft 23 which rotates, converts the rotational movement of the rotational shaft 23 into linear reciprocating movement, and the piston 27 reciprocates thus to suck, compress and discharge refrigerant in the compression space 28 of the cylinder 29.

However, in the conventional reciprocating gas compressor as described above, the piston performs reciprocating movement continuously in an uniform distance sucking, compressing and discharging gas and accordingly, there is a disadvantage that the stroke distance can not be adjusted according to necessity since the stroke distance of the piston with the gas compression method is fixed.

SUMMARY OF THE INVENTION

Therefore, an object of the present invention is to provide an oscillating reluctance motor which is suitable for periodically rotating in a certain angle and generating a resonance at a certain frequency thus to increase efficiency.

Also, the present invention provides a gas compressor using an oscillating reluctance motor, which is suitable for adjusting a stroke distance due to having an oscillating reluctance motor which performs a periodical rotation movement in a certain angle.

To achieve these and other advantages and in accordance with the purpose of the present invention, as embodied and broadly described herein, there is provided an oscillating reluctance motor comprising a rotor in which a rotational shaft is fixed at the center and a pair of teeth are protruded-formed outside, a stator in which a cylindrical space is formed so that the rotor can rotate and in which first and second winding parts are formed and a rotation controlling means which is installed between the rotor and a stator thus to control rotation of the rotor, where a first winding coil is wound on the first winding part, a second winding coil is wound on the second winding part and the first winding part and the second winding part are formed having a certain angle centering around the rotational shaft as a pair so that the rotor can perform reciprocating rotational movement.

There is also provided a gas compressor using an oscillating reluctance motor comprising an oscillating reluctance motor for performing reciprocating rotational movement of a certain angular, a connecting rod which is combined to an eccentricity part installed at one end portion of the rotational shaft in the oscillating reluctance motor, a piston which is connected to one end portion of the connecting rod and a cylinder having a space in which the piston performs reciprocating movement to compress gas.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the embodiments of the present invention, examples of which are illustrated in the accompanying drawings.

Figure 3:
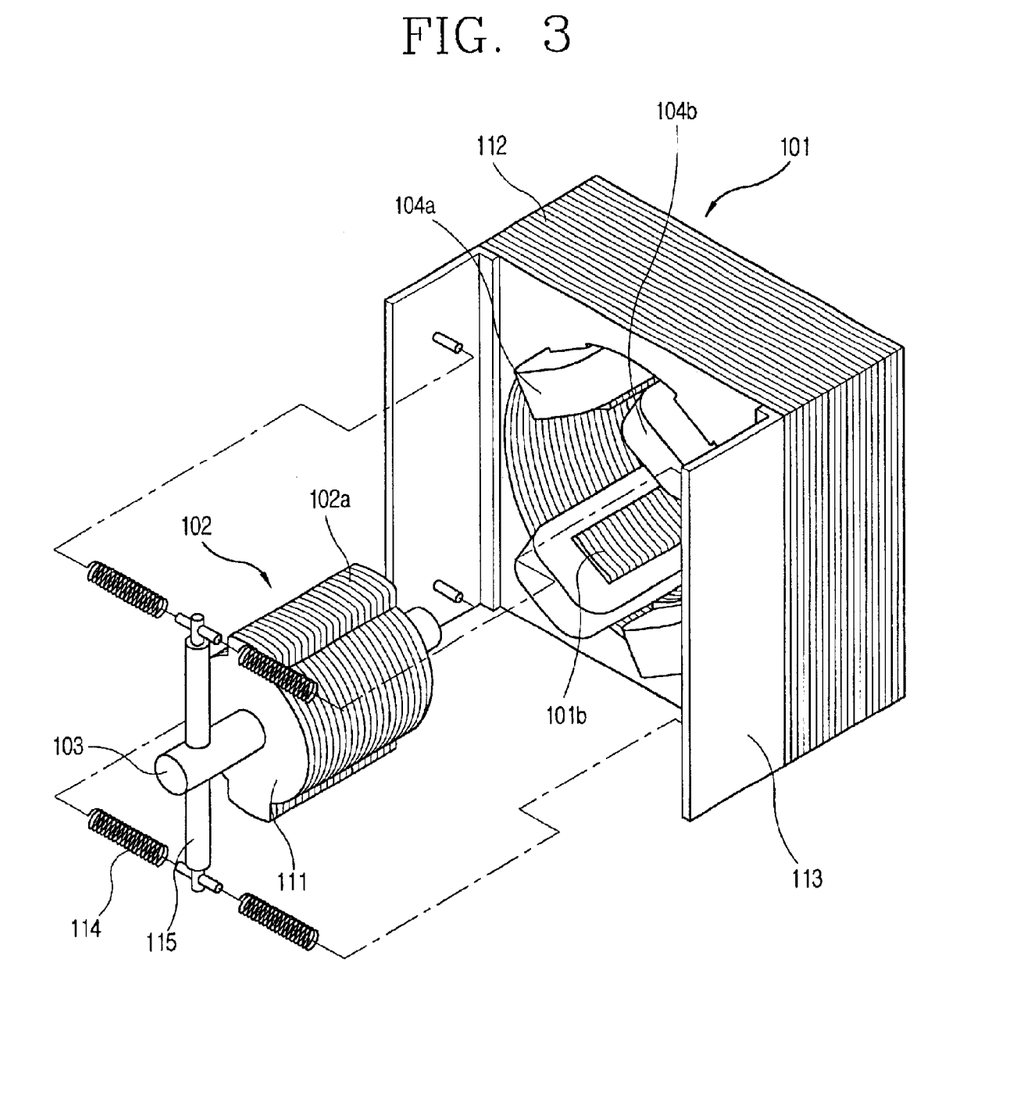
FIG. 3 is a perspective view showing a structure of an oscillating reluctance motor in accordance with the present invention.
Figure 4:
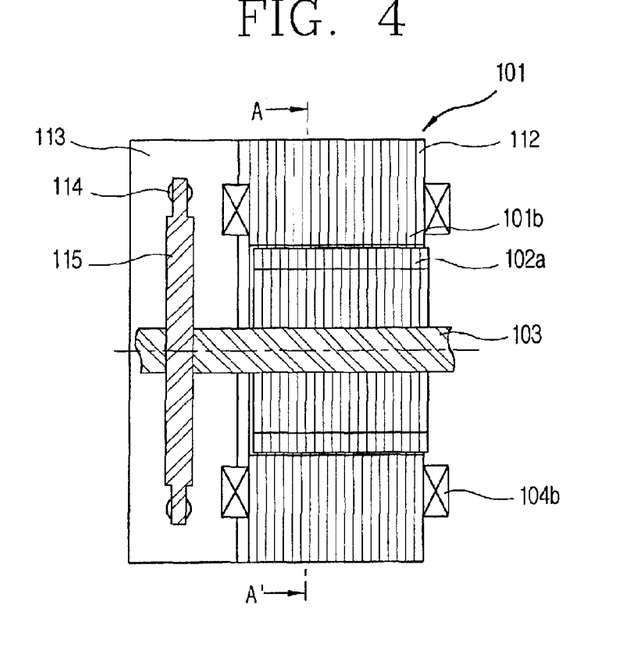
FIG. 4 is a transverse sectional view showing a structure of a reciprocating gas compressor in accordance with the present invention.
Figure 5:
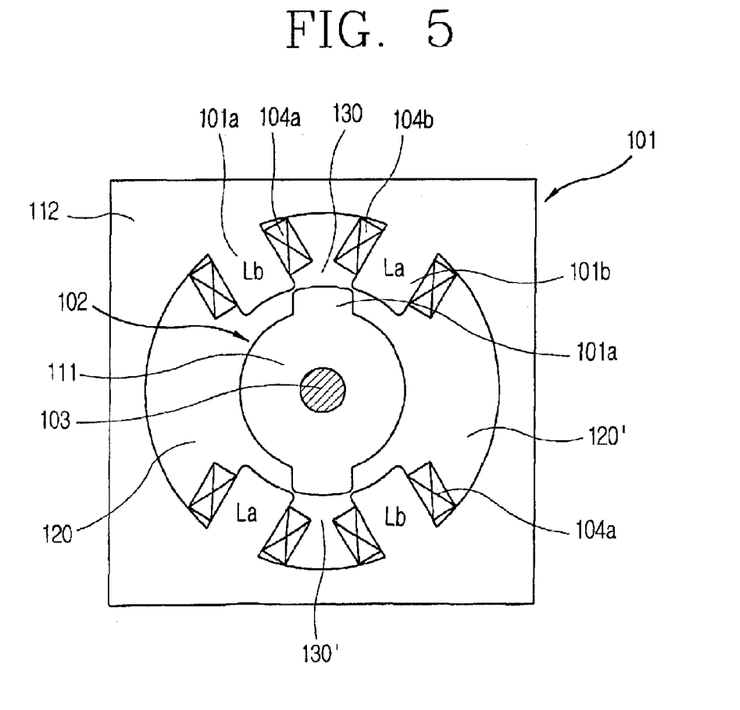
FIG. 5 is a transverse sectional view taken along section line A–A' of FIG. 4.

FIG. 3 is a perspective view showing a structure of an oscillating reluctance motor in accordance with the present invention, FIG. 4 is a transverse sectional view showing a structure of a reciprocating gas compressor in accordance with the present invention and FIG. 5 is a transverse sectional view taken along section line A–A' of FIG. 4.

As shown in FIGS. 3 and 4, the oscillating reluctance motor in accordance with the present invention comprises a rotor 102 a center of which a rotational shaft 103 is fixed to, and from which a pair of rotor teeth 102a are protruded-formed outside, said rotor teeth 102a facing each other centering on the rotational shaft 103, a stator 101 in which a cylindrical space is formed so that the rotor rotates and first and second winding parts are formed, and rotation control means which is installed between the rotor 102 and a stator 101 thus to control rotation of the rotor 102, wherein a first winding coil 104a is wound on the first winding part, a second winding coil 104b is wound on the second winding part, and the first winding part and the second winding part are formed having a certain angle centering around the rotational shaft as a pair so that the rotor 102 can perform periodical rotation movement.

In the rotor 102, lamination sheets are laminated forming a rotor core 111 and in the rotor core 111, a pair of rotor teeth 102a facing each other around the rotational shaft 103, are protruded-formed.

In the stator 101, lamination sheets are laminated forming a stator core 112 and in the stator, the stator teeth 101a, 101b which composes the first winding part and the second winding part, are formed.

The stator teeth 101a, 101b have a certain angle centering on the rotational shaft 103 and divides the inner portion of the stator core 112 into irrotational areas 120, 120' and periodical rotation areas 130, 130'.

On the other hand, coils 104a, 104b are respectively wound on the stator teeth 101a, 101b which compose the first winding part and the second winding part.

The periodical rotation areas 130, 130' perform periodical rotation movement by exciting the stator teeth 101a, 101b in turn.

Figure 6:
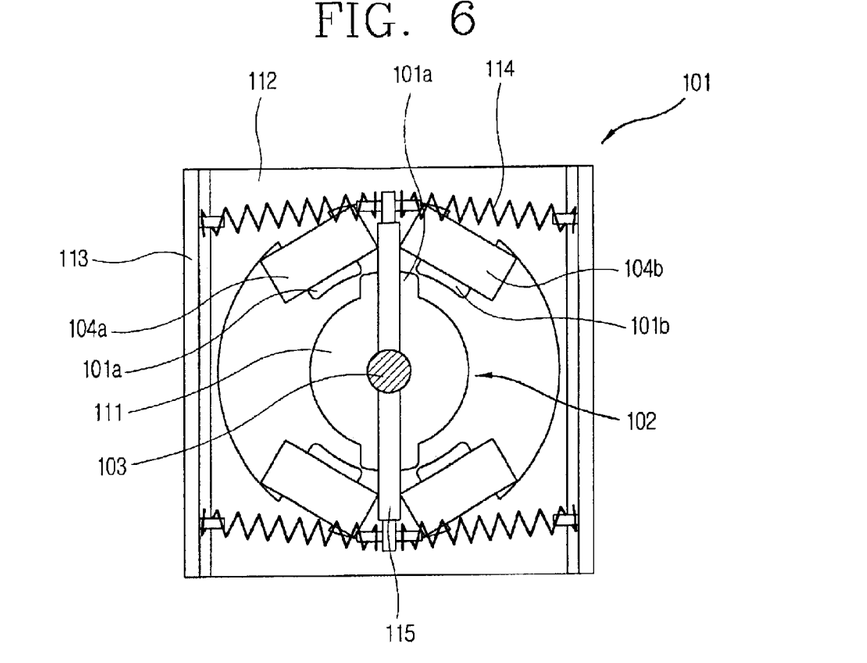
FIG. 6 is a plan view showing a rotation control means of the oscillating reluctance motor in accordance with the present invention.

The rotation control means as shown in FIG. 6, comprises a rotary bar 115 which is combined to an end portion of the rotational shaft 103, said rotary bar 115 performing rotational movement with the rotational shaft 103, a pair of coil springs 114 each end portion of which is fixed to one end portion of the rotary bar 115 and, which is an elastic member to resonate the rotary bar 115 and a pair of brackets 113 which are respectively fixed to each upper side of the stator core 112 or the motor case (not shown), and the other end portions of the coil springs 114 are fixed to the brackets 113.

In the meantime, the coils 104a, 104b respectively wound on the stator teeth 101a, 101b are electrically connected ones. Accordingly, the coils are respectively excited at the same time by controlling a switch and form one phase (La or Lb).

In the oscillating reluctance motor in accordance with the present invention having the above-described structure, when power is applied to the coils 104a, 104b which are wound on the stator teeth 101a, 101b, the stator teeth 101a, 101b are excited at the same time by the coils 104a, 104b, and accordingly the rotor teeth 102a of the rotor 102 rotates in the direction that the magnetic reluctance becomes "0", thus to generate rotational torque.

When electric current is applied to each phase (La or Lb) by switching means in turn, the rotor 102 oscillates in the periodical rotation areas 130, 130' in the direction of excitation and by the periodical rotation of the rotor 102, the rotational shaft 103 which is an output shaft performs periodical rotation of a certain angular interval.

Also, the rotary bar 115 which rotates at the same time together with the rotational shaft 103 performing periodical rotation, is restricted from rotating larger than a certain angle by the coil springs 114 which are combined to one end portion of the rotary bar 115, and resonates by tension/compression of the coil springs 114.

Figure 7:
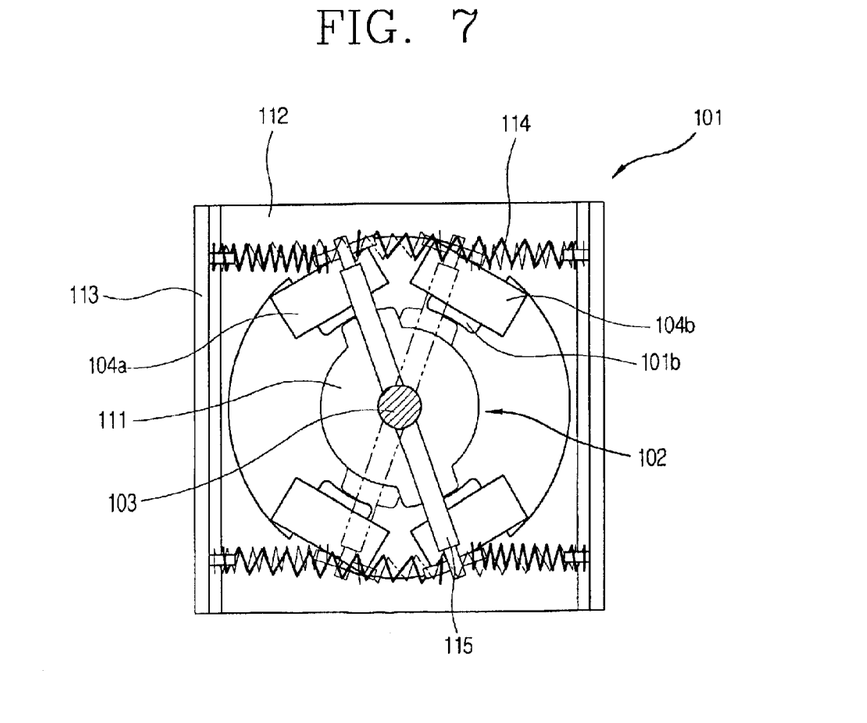
FIG. 7 is a plan view showing the rotation control means of the oscillating reluctance motor in accordance with the present invention.

Such resonance is used as power source by connecting the rotational shaft 103 which performs reciprocating movement with a reciprocating movement apparatus since the resonance enable the rotational shaft 103 to perform periodical rotation movement at high speed, synchronized with frequency of inputted power, as shown in FIG. 7.

Figure 8:
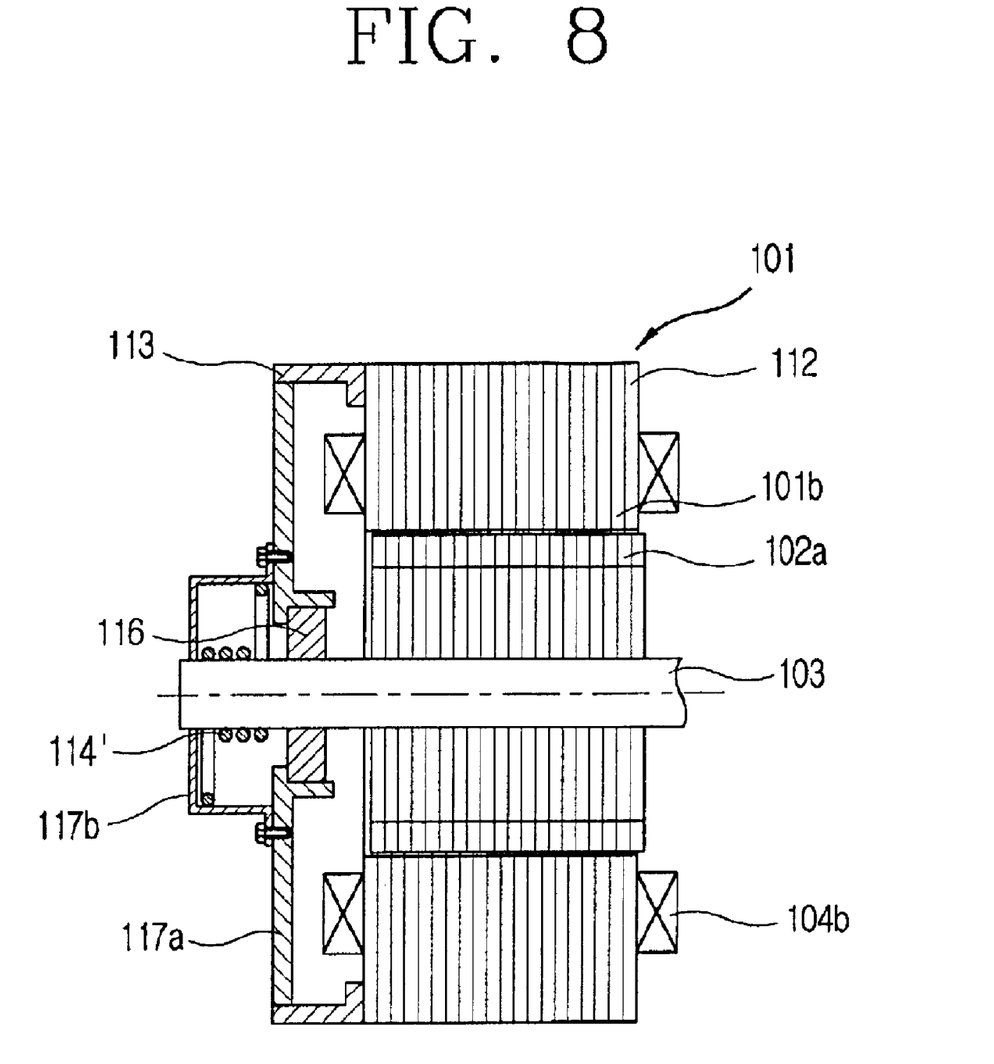
FIG. 8 is a transverse sectional view showing a modified embodiment of the oscillating reluctance motor in accordance with the present invention.

FIG. 8 is a transverse sectional view showing a modified embodiment of the oscillating reluctance motor in accordance with the present invention.

As shown in FIG. 8, the rotation control means includes a torsion spring 114' which is installed at one end portion of the rotational shaft 103, supporting means 117a, 117b to which the torsion spring 114' is fixed, said supporting means 117a, 117b being fixed to the stator 101 or the motor case (not shown), and a bearing 116 which is installed to the supporting means 117a, 117b, the bearing 116 rotatably fixing the rotational shaft 103.

The oscillating reluctance motor restricts the rotational shaft 103 from rotating more than a certain angular interval by the rotation control means having the above-described structure and can resonate the rotational shaft 103.

In the meantime, by the oscillating reluctance motor enables an efficient high speed reciprocating movement and accordingly, it can be used as a motor device part of a gas compressor which needs high speed reciprocating movement.

Hereinafter, the gas compressor using an oscillating reluctance motor in accordance with the present invention will be described in detail with reference to an embodiment of the accompanied drawing.

Figure 9:
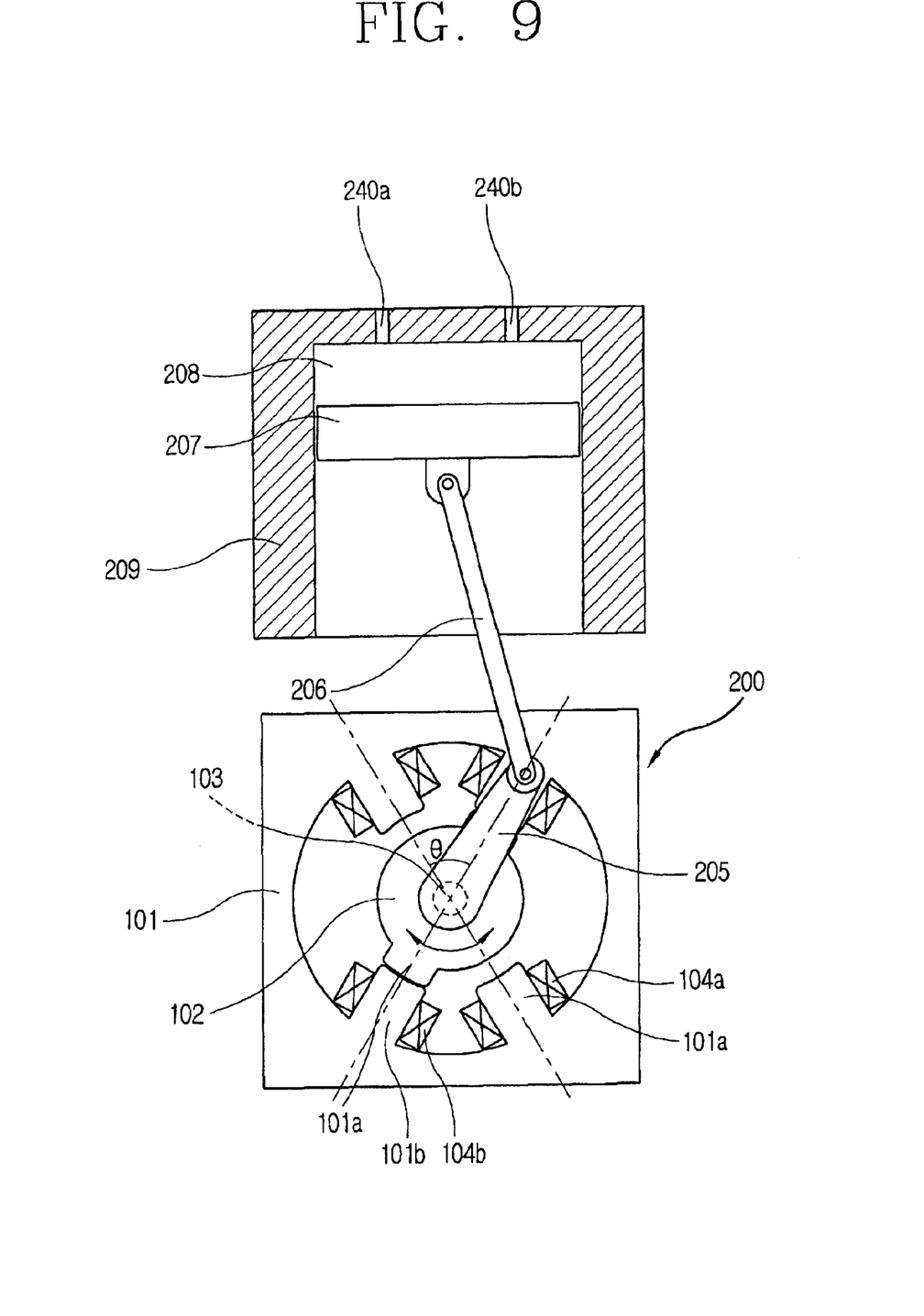
FIG. 9 is a transverse sectional view showing a reciprocating gas compressor using the oscillating reluctance motor in accordance with the present invention.

FIG. 9 is a transverse sectional view showing a reciprocating gas compressor using the oscillating reluctance motor in accordance with the present invention.

As shown in FIG. 9, the reciprocating gas compressor using an oscillating reluctance motor in accordance with the present invention comprises an oscillating reluctance motor 200 for performing periodical rotation movement in a certain angular interval, a connecting rod 206 which is combined to an eccentricity part 205 installed at one end portion of the rotational shaft 103 in the oscillating reluctance motor 200, a piston 207 which is connected to one end portion of the connecting rod 206, and a cylinder 209 having a compression space 208 in which the piston 207 performs reciprocating movement to compress gas.

Namely, the eccentricity part 205 is installed at the upper end portion of the rotational shaft 103 in the oscillating reluctance motor 200 which performs periodical rotation movement within a certain angular interval, and one end portion of the connecting rod 206 is connected to the eccentricity part 205.

Also, the piston 207 for compressing gas is combined to the other end portion of the connecting rod 206 and the piston 207 is combined with the compression space 208 of the cylinder 209 slidably.

Also, as shown in FIGS. 3, 4 and 5, there is provided an oscillating reluctance motor 200 including a rotor 102 a center of which a rotational shaft 103 is fixed to, and from which a pair of rotor teeth 102a are protruded-formed outside, said rotor teeth 102a facing each other centering on the rotational shaft 103, a stator 101 in which a cylindrical space is formed so that the rotor rotates and first and second winding parts are formed, and a rotation control means which is installed between the rotor 102 and a stator 101 thus to control rotation of the rotor 102, wherein a first winding coil 104a is wound on the first winding part, a second winding coil 104b is wound on the second winding part and the first winding part and the second winding part are formed having a certain angle centering around the rotational shaft 103 as a pair so that the rotor 102 can perform periodical rotation movement.

In the cylinder 209, a suction hole 240a for sucking gas into the compression space 208 and a discharge hole 240b for discharging the compressed air from the compression space 208 are formed, and at the outlet end of the suction hole 240a and discharge hole 240b, valves are respectively provided.

With the gas compressor using the oscillating reluctance motor in accordance with the present invention having the above-described structure, if power supply is applied to the phases La and Lb in the oscillating reluctance motor 200, each phase is excited in turn and the rotor 102 oscillates performing periodical rotation movement within a certain angular interval.

A rotational shaft 103, fixed to the rotor 102 which oscillates, performs periodical rotation movement, and the connecting rod 206, combined to the eccentricity part 205 of the rotational shaft 103 which performs periodical rotation movement, at the same time reciprocates a certain distance, and accordingly the piston 207 performs reciprocating linear movement in the compression space 208 of the cylinder 209 thus to compress gas sucked into the compression space 208.

Namely, the piston 207 performs reciprocating movement with a certain stroke in the compression space 208 of the cylinder 209, compresses the gas sucked in the compression space 208 through the suction hole 240a and discharges the compressed gas through the discharge hole 240b. By adjusting the rotation angle θ of the oscillating reluctance motor 200, the stroke distance of the piston 207 can be easily adjusted.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An oscillating reluctance motor comprising:
   a rotor having a rotational shaft fixed to a center of the rotor, and a pair of teeth protruding from the center of the rotor and being positioned opposing to each other with respect to the rotational shaft;
   a stator having a cylindrical space so that the rotor can rotate therein and first and second winding parts;

a first winding coil being wound on a first winding part;

a second winding coil being wound on a second winding part;

a rotary bar combined with the rotational shaft; and a coil spring connected to the rotary bar so as to control the rotation of the rotor at a predetermined angle.

2. A gas compressor having the oscillating reluctance motor in accordance with claim 1, said oscillating reluctance motor performing reciprocating rotational movement of a certain angular interval for said gas compressor, said gas compressor comprising:

a connecting rod being combined with an eccentric part a piston connected to a first end portion of the connecting rod; and a cylinder having a space in which the piston performs reciprocating movement to compress gas.

* * * * *